United States Patent
Smart et al.

(10) Patent No.: US 7,480,487 B2
(45) Date of Patent: Jan. 20, 2009

(54) POWER REGULATION FOR FIELD INSTRUMENTS

(75) Inventors: Harold R. Smart, Portsmouth, RI (US); Peter S. Levesque, Norwood, MA (US)

(73) Assignee: Dresser, Inc., Addison, TX (US)

( * ) Notice: Subject to any disclaimer, the term of this patent is extended or adjusted under 35 U.S.C. 154(b) by 376 days.

(21) Appl. No.: 11/134,031

(22) Filed: May 20, 2005

(65) Prior Publication Data
US 2006/0273776 A1    Dec. 7, 2006

(51) Int. Cl.
*H04B 1/00* (2006.01)
*H04B 7/00* (2006.01)

(52) U.S. Cl. .......................... 455/69; 455/572; 455/574; 455/571; 323/277; 323/280; 363/17; 363/65

(58) Field of Classification Search ................... 455/69, 455/571, 572, 574; 323/277; 363/17
See application file for complete search history.

(56) References Cited

U.S. PATENT DOCUMENTS

| | | | | |
|---|---|---|---|---|
| 5,331,537 A | * | 7/1994 | Skarpetowski | ............... 363/138 |
| 5,729,119 A | * | 3/1998 | Barbour | ....................... 323/222 |
| 5,731,693 A | * | 3/1998 | Furmanczyk | ................ 323/274 |
| 5,737,197 A | * | 4/1998 | Krichtafovitch et al. | ...... 363/17 |
| 5,809,054 A | * | 9/1998 | Oelscher | ...................... 373/104 |
| 5,936,514 A | * | 8/1999 | Anderson et al. | ........... 323/234 |
| 5,959,372 A | * | 9/1999 | Every | .......................... 307/131 |
| 6,021,057 A | * | 2/2000 | Linden et al. | ................. 363/65 |
| 6,100,605 A | | 8/2000 | Zajkowski | |
| 6,118,266 A | * | 9/2000 | Manohar et al. | ............. 323/316 |
| 6,140,940 A | * | 10/2000 | Klofer et al. | ........... 340/870.39 |
| 6,191,566 B1 | * | 2/2001 | Petricek et al. | .............. 323/224 |
| 6,239,996 B1 | * | 5/2001 | Perreault et al. | ............... 363/89 |
| 6,369,461 B1 | | 4/2002 | Jungreis et al. | |
| 6,388,431 B1 | * | 5/2002 | Kramer et al. | ............... 323/266 |
| 6,487,096 B1 | * | 11/2002 | Gilbreth et al. | ................ 363/35 |
| 6,519,508 B1 | | 2/2003 | Saito | |
| 6,930,956 B2 | * | 8/2005 | Mercier | ....................... 367/99 |
| 7,301,317 B1 | | 11/2007 | Mattingly | |
| 7,305,571 B2 | * | 12/2007 | Cranford et al. | ............ 713/300 |
| 7,405,550 B2 | * | 7/2008 | Apfelbacher et al. | ........ 323/284 |
| 2002/0149954 A1 | | 10/2002 | Besnier et al. | |

(Continued)

FOREIGN PATENT DOCUMENTS

DE        102 46 878        4/2003

(Continued)

OTHER PUBLICATIONS

Albert R. Hughes, Loop-Powered Field Instrument, May 20, 2005, U.S. Appl. No. 11/134,032, pp. 1-35.

(Continued)

*Primary Examiner*—Marceau Milord
(74) *Attorney, Agent, or Firm*—Fish & Richardson P.C.

(57) ABSTRACT

Effective power regulation may be achieved for a field instrument that derives power from a communication signal. In particular aspects, a system and process for power regulation include the ability to receive a communication signal and adjust the voltage supplied to a power converter based on the current of the communication signal. The system and method also include the ability to convert power of the communication signal with the power converter.

31 Claims, 6 Drawing Sheets

U.S. PATENT DOCUMENTS

2003/0067794 A1    4/2003    Boylan et al.

FOREIGN PATENT DOCUMENTS

| EP | 0 422 663 | 4/1991 |
|---|---|---|
| EP | 0895209 A | 2/1999 |
| EP | 1 020 973 | 7/2000 |
| WO | WO 88/01417 | 2/1988 |
| WO | WO 94/20940 | 9/1994 |

OTHER PUBLICATIONS

Power Electronic Interactive Text—Contents, Interactive Power Electronics Online Course, [retrieved from internet on Mar. 17, 2005], http://www.powerdesigners.com/InfoWeb/resources/pe_html/contents.htm, pp. 1-2.

Closed Loop Control, Introduction, [retrieved from internet on Mar. 17, 2005], http://www.powerdesigners.com/InfoWeb/resources/pe_html/ch07s1/intro.html, pp. 1-5.

Step-Down SMPS/Buck Converter: Ideal Circuit, Step-Down/Buck Converter: Ideal Circuit, [retrieved from internet on Mar. 17, 2005], http:www.powerdesigners.com/InfoWeb/resources/pe_html/ch07s1/ch07s1p1.htm, p. 1.

Step-Down SMPS/Buck Converter: Ideal Circuit, Basic Circuit Operation, [retrieved from internet on Mar. 17, 2005], http://www.powerdesigners.com/InfoWeb/resources/pe_html/ch07s1/bas_ckt.html, pp. 1-11.

Texas Instruments, 800-mA Synchronous Step-Down Converter, Sep. 2002, Revised Oct. 2003, pp. 1-24.

International Preliminary Report on Patentability, PCT/US2006/019174, Sep. 5, 2007, pp. 1-11.

International Search Report, PCT/US2006/019340, Sep. 24, 2007, pp. 1-4.

Written Opinion of the International Searching Authority, PCT/US2006/019340, Sep. 24, 2007, pp. 1-7.

PCT International Search Report, PCT/US2006/019174, Oct. 6, 2006, pp. 1-3.

PCT Written Opinion of the International Searching Authority, PCT/US2006/019174, Oct. 6, 2006, pp. 1-7.

PCT International Preliminary Report on Patentability, PCT/US2006/019340, Dec. 6, 2007, pp. 1-8.

European Office Communication Pursuant to Article 94(3) EPC, European Application No. EP 06 760 063.5, Apr. 8, 2008, pp. 1-5.

* cited by examiner

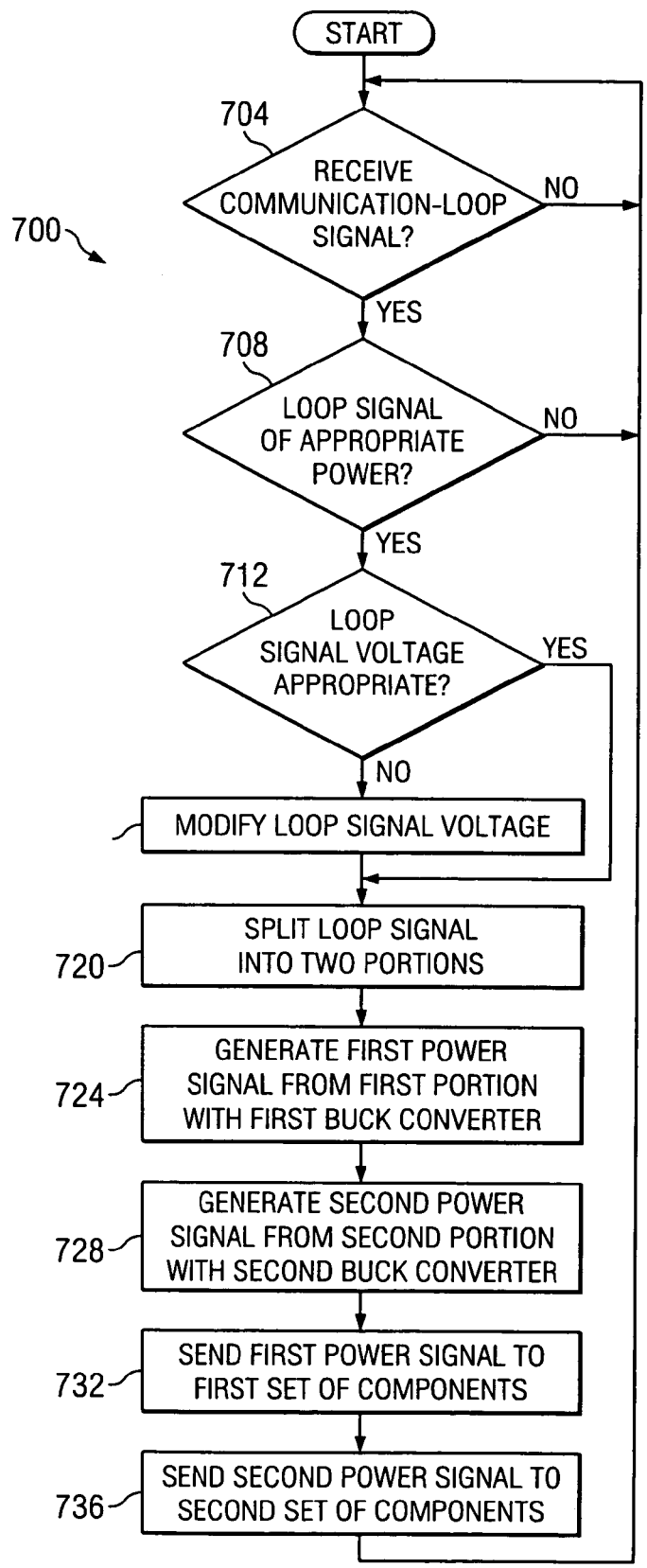

POWER REGULATION FOR FIELD INSTRUMENTS

TECHNICAL FIELD

This description relates to electrical power and, more particularly, to power regulation.

BACKGROUND

Field instruments (e.g., valve positioners) are used in a wide variety of environments for both commercial and industrial applications. Because of their varied use, field instruments often operate in remote areas and/or hazardous environments in which supply power is not readily available. In these instances, and numerous others, many field instruments obtain at least part of their power from their control signaling system (e.g., a 4-20 mA system). This power may be used to operate a variety of electronic components of the field instrument, including sensors, actuators, controllers, and transceivers.

For a variety of reasons (e.g., power consumption, reliability, and safety), it is typically desirable to operate the electronic components of a field instrument at a lower voltage than its control signaling system (e.g., 10 V versus 24 V). Typical devices for down-converting the voltage in a field instrument are switched-capacitor voltage converters and linear voltage converters.

Unfortunately, control signaling systems often have relatively low powers (e.g., <2 W), and with the increasing number and complexity of electronic components used in field instruments, sufficient power may not be available using current power derivation techniques.

SUMMARY

Field instruments may derive at least part of their power from their communication signaling. Regulating the power derived from communication signaling may be important for safety and/or performance considerations.

In one general aspect, a power-regulation process for a field instrument may include receiving a communication signal and adjusting the voltage supplied to a power converter based on the current of the communication signal. The process may also include converting power of the communication signal with the power converter.

The process may additionally include monitoring the communication signal for an inappropriate characteristic (e.g., an inappropriate voltage level, current level, or noise level). The communication signal may be modified to correct the inappropriate signal characteristic.

Adjusting the voltage supplied to the power converter based on the current of the communication signal may be accomplished in a variety of manners. Particular implementations call for increasing the voltage if the signal current is low and decreasing the voltage if the signal current is high. If the communication signal is a communication-loop signal, for example, the supplied voltage may be approximately 9 V when the current is approximately 4 mA and approximately 7 V when the current is approximately 20 mA. The voltage may be adjusted on an approximately linear basis in relation to the signal current.

The process may also include determining whether the voltage of the communication signal is appropriate and, if the voltage of the communication signal is not appropriate, refusing to convert power of the communication signal with the power converter. Particular implementations may include determining whether an interruption in the communication signal has occurred and, if an interruption in the communication signal has occurred, temporarily supplying power to the power converter.

The process may additionally include converting power of the communication signal with a second power converter.

In another general aspect, a field instrument may include a communication interface, a power converter, and an adjustable voltage regulator. The communication interface may be operable to receive a communication signal, and the power converter may be coupled to the communication interface and operable to convert power of the communication signal. The adjustable voltage regulator may also coupled to the power converter. The adjustable voltage regulator may be operable to adjust the voltage supplied to the power converter based on the current of the communication signal. For example, the adjustable voltage regulator may increase the supplied voltage if the signal current is low and decrease the supplied voltage if the signal current is high.

The field instrument may also include a power monitor and/or power supply (e.g., a capacitor). The power monitor may be coupled to the communication interface and the power converter and operable to determine whether the voltage of the communication signal is appropriate and, if the voltage of the communication signal is appropriate, allow the power converter to operate. The power supply may also be coupled to the communication interface and the power converter. The power supply may be operable to temporarily supply power to the power converter if the communication signal is interrupted.

The field instrument may additionally include a second power converter. The second power converter may be coupled to the communication interface and operable to convert power of the communication signal.

In a particular aspect, a field instrument includes a communication interface, a first power converter, a second power converter, an adjustable voltage regulator, a power monitor, and a power supply. The communication interface is operable to receive a communication-loop signal, and the first power converter and the second power converter are coupled to the communication interface. The first power converter and the second power converter are operable to convert power of the communication-loop signal. The adjustable voltage regulator is coupled to the power converters and operable to adjust the voltage supplied to the power converters based on the current of the communication-loop signal. Adjusting the signal includes increasing the voltage if the signal current is low and decreasing the voltage if the signal current is high. The power monitor and the power supply are coupled to the communication interface and the power converters. The power monitor is operable to determine whether the voltage of the communication-loop signal is appropriate and, if the voltage of the communication-loop signal is appropriate, allow the power converters to operate. The power supply is operable to temporarily supply power to the power converter if the communication-loop signal is interrupted.

Various implementations may have one or more features. For example, power regulation may provide increased power from a communication signal by taking advantage of the fact that at lower currents, more voltage may be available than at higher currents. As another example, power regulation may provide frequency-dependent impedance required for a secondary communication protocol. As an additional example, power regulation may provide reliable initialization and transient performance and/or protect against deleterious input signal effects.

The details of one or more implementations are set forth in the accompanying drawings and the description below. Other features will be apparent from the description and drawings, and from the claims.

BRIEF DESCRIPTION OF DRAWINGS

FIG. 7 is a flow chart illustrating one implementation of a process for power conversion for a loop-powered field instrument.

Like reference symbols in the various drawings indicate like elements.

DETAILED DESCRIPTION

Process monitoring and/or control may be achieved by any of a variety of types of field instruments. For example, a fluid regulator (e.g., a valve) for a fluid process may be controlled by a fluid regulator controller (e.g., a valve positioner). Many types of field instruments derive at least part of their power from external control signals; however, a field instrument's components may prefer that their supply power be in a different format from the control signals (e.g., at a lower voltage). Thus, the power in the control signals may be converted to a different format. Converting the power in the control signals efficiently allows additional and/or more sophisticated components to be included in the field instrument.

Figure 1:
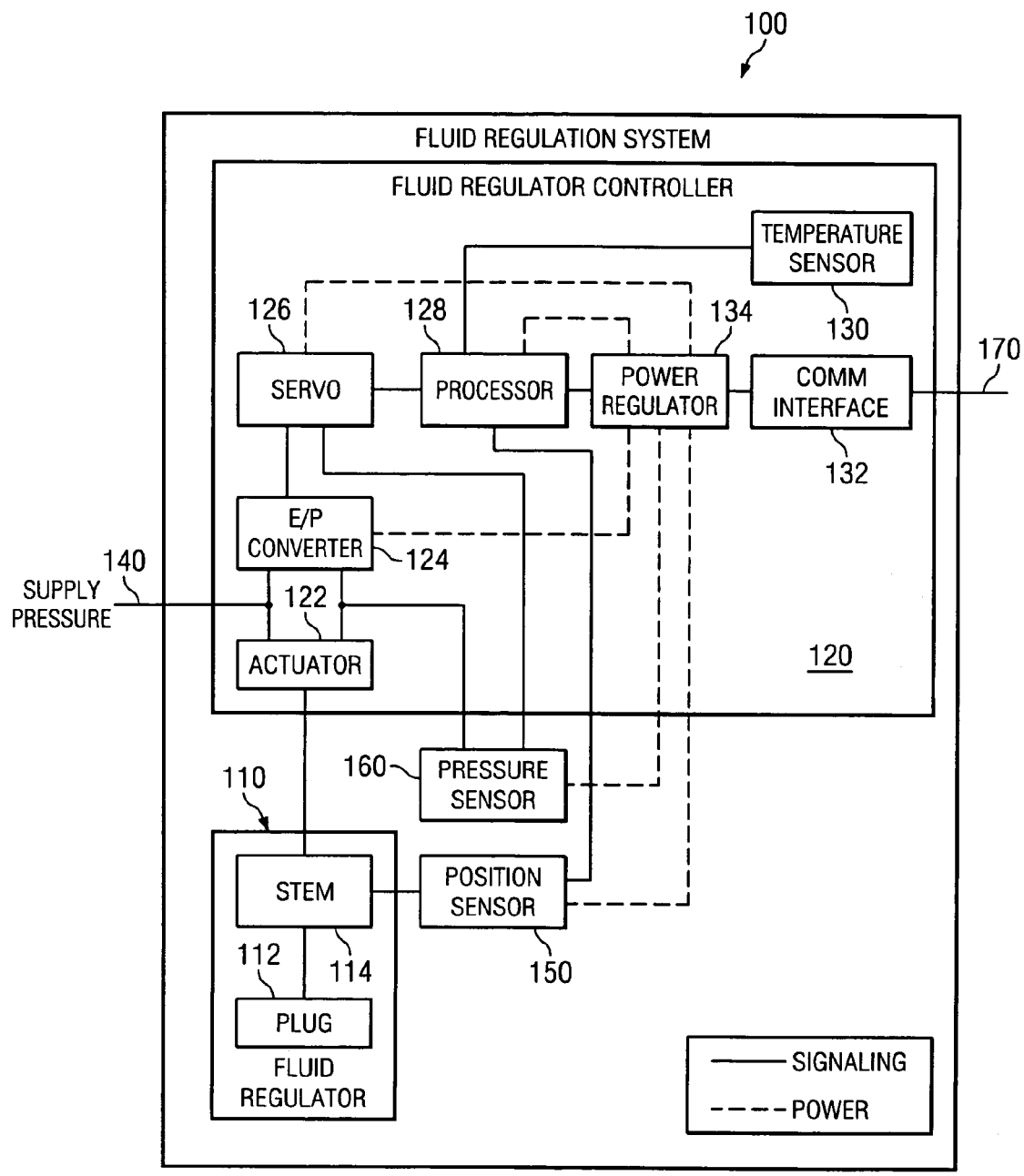
FIG. 1 is a block diagram illustrating one implementation of a loop-powered field instrument.

FIG. 1 illustrates a fluid regulation system 100. Fluid regulation system 100 includes a fluid regulator 110 and a fluid regulator controller 120, which is one example of a field instrument. Fluid regulator 110 physically interacts with a fluid (liquid and/or gas) to affect it, and fluid regulator controller 120 controls fluid regulator 110 and, hence, regulates the fluid.

In more detail, fluid regulator 110 includes a plug 112 and a stem 114. Plug 112 is responsible for interfacing with a fluid to be regulated to alter its characteristics (e.g., flow and/or pressure). To alter the fluid, plug 112 typically moves within a volume in which the fluid exists, which may or may not be part of the fluid regulator. Plug 112 may be composed of plastic, metal, rubber, composite, or any other appropriate material. Stem 114 is coupled to plug 112 and is responsible for communicating translational motion to move plug 112 relative to the regulated fluid. Stem 114 may, for example, be a rod that is composed of metal. In particular implementations, fluid regulator 110 may be a valve (e.g., a globe valve). In other implementations, however, fluid regulator 110 may be any other appropriate device for affecting a fluid.

Fluid regulator controller 120, which may, for example, be a valve positioner, includes an actuator 122, an electric-to-pressure converter 124, a servo 126, and a processor 128. Actuator 122 is coupled to stem 114 and responsible for moving the stem and, hence, plug 112. In this implementation, actuator 122 is a pneumatic actuator that receives a pressure from a supply line 140. Actuator 122 may, for example, include a piston subjected to differential pressure or a pressure-activated spring. Electric-to-pressure converter 124 is coupled to actuator 122 and responsible for converting electrical control signals (current and/or voltage) to pressure control signals for actuator 122. To accomplish this, electric-to-pressure converter 124 is pneumatically powered and receives a pressure from supply line 140. Electric-to-pressure converter 124 may, for example, include a spool valve or a pneumatic relay.

Servo 126 is coupled to electric-to-pressure converter 124 and responsible for generating electrical control signals for electric-to-pressure converter 124. Servo 126 may, for example, be a proportional-integral-derivative (PID) controller. Processor 128 is coupled to servo 126 and responsible for determining how to control plug 112. Processor 128 may, for example, be a microprocessor, a field-programmable gate array, or any other appropriate device for manipulating information in a logical manner. Processor 128 typically includes memory, which may include random-access memory (RAM), read-only memory (ROM), compact-disk read-only memory (CD-ROM), registers, and/or any other appropriate device for storing information. The memory may store instructions for the processor, data regarding fluid regulation system 100, and/or any other appropriate information.

Fluid regulator controller 120 also includes a temperature sensor 130, a communication interface 132, and a power regulator 134. Temperature sensor 130 is responsible for determining the temperature of electronics and sensors of system 100 and providing this information to processor 128, which may compensate for temperature effects. Temperature sensor 130 may, for example, be a resistive-temperature device or a thermocouple. Communication interface 132 is coupled to processor 128 and allows the processor to send and receive information outside of fluid regulation system 100 over a communication loop 170. The sent information may, for example, include one or more conditions of the regulated fluid and/or the fluid regulation system. The received information may, for example, include commands and/or instructions for regulating the fluid and/or status inquiries. Communication interface 132 may be a modem, a network interface card, a transformer, or any other appropriate device for sending and receiving information over communication loop 170, which may operate according to any appropriate technique (e.g., HART, Foundation Fieldbus, or 4-20 mA) that allows fluid regulator controller 120 to extract power from the signals received through the communication interface. Communication interface 132 may contain barriers and other components that assist in making the fluid regulator controller intrinsically safe.

Power regulator 134 is coupled to communication interface 132 and processor 128 and responsible for converting power in the signals received through the communication interface into an appropriate format for powering components of fluid regulator controller 120—electric-to-pressure converter 124, servo 126, and processor 128 in this implementation. Power regulator 134 may produce a consistent voltage output while allowing the current output to vary with the load. For instance, the power converter may convert a 20 mA signal at 9 V into a 10 mA signal at 3.3 V and a 4 mA signal at 11 V into a 10 mA signal at 3.3 V. Power conversion may decrease the power consumption and increase the reliability and safety of the fluid regulator controller. In particular implementations, power regulator 134 may accomplish this using a low-power buck converter, which may allow conversion efficiencies of over 90% to be achieved even at relatively low loop powers (e.g., <2 W). Also, power regulator 134 may adjust the voltage used in the power conversion process depending on the supplied current. By using a higher voltage for a lower-current signal, power regulator 134 may, for example, allow more power to be delivered to the components of fluid regulation system 100. Extra power may be shunted through the power regulator.

Fluid regulation system 100 also includes a position sensor 150 and a pressure sensor 160. In this implementation, power regulator 134 also converts the loop signal into an appropriate power for position sensor 150 and pressure sensor 160.

Position sensor 150 is responsible for determining the position of stem 114, which correlates with the position of plug 112, and providing this information to processor 128. Position sensor 150 may operate by electrical, electromagnetic, optical, and/or mechanical techniques and may or may not be physically coupled to stem 114. In particular implementations, position sensor 150 may be an electromagnetic sensor (e.g., a Hall-effect sensor). Pressure sensor 160 is coupled to the pressure line between electric-to-pressure converter 124 and actuator 122 and responsible for determining the pressure delivered by electric-to-pressure converter 124 to actuator 122 and providing this information to servo 126. Pressure sensor 160 may, for example, be a piezo-type sensor.

In one mode of operation, processor 128 determines the appropriate position for plug 112, perhaps based on instructions received through communication interface 132, and generates a signal related to the required actuator pressure. In particular implementations, the signal may form or be part of a structured message (e.g., a packet). Servo 126 determines the appropriate command signal for electric-to-pressure converter 124 based on the signal from processor 128 and the current pressure to actuator 122, which it receives from pressure sensor 160, and sends the command signal to electric-to-pressure converter 124. Electric-to-pressure converter 124 converts the command signal to a pressure, which is sent to actuator 122. Actuator 122 attempts to move stem 114, and, hence, plug 112, in accordance with the applied pressure.

Also during operation, pressure sensor 160 senses the pressure to actuator 122 and provides a signal representative of the pressure to servo 126. Servo 126 compares the actuator pressure with the command from processor 128 and adjusts the command signal to electric-to-pressure converter 124 to achieve the appropriate pressure. Additionally, position sensor 150 ascertains the position of stem 114 and provides a signal representing the position to processor 128. Processor 128 also receives an environment temperature (from temperature sensor 130). Processor 128 can then determine whether any adjustments need to be made regarding the plug position and/or whether the fluid regulation system is behaving properly (e.g., by examining position response time), which may also require adjustments.

If adjustments should be made, processor 128 can generate another signal for servo 126. Additionally, processor 128 may generate signals representing the status (parameter values and/or condition) of fluid regulation system 100 and send the signals through communication interface 132. A status signal may be sent in response to a query received through the communication interface. Also, an alert signal, possibly of an appropriate level, may be generated if conditions warrant. In certain implementations, the alert signal may correspond to a color that represents the health of the fluid regulation system.

Although discussed in the context of fluid regulator controller 120, power regulator 134 may be useful for a variety of other field instruments, such as, for example, process monitors. In general, a field instrument may be any type of device for monitoring and/or controlling a process. Additionally, a field instrument may include other power sources (e.g., wireline, wireless, solar, and/or battery).

Figure 2:
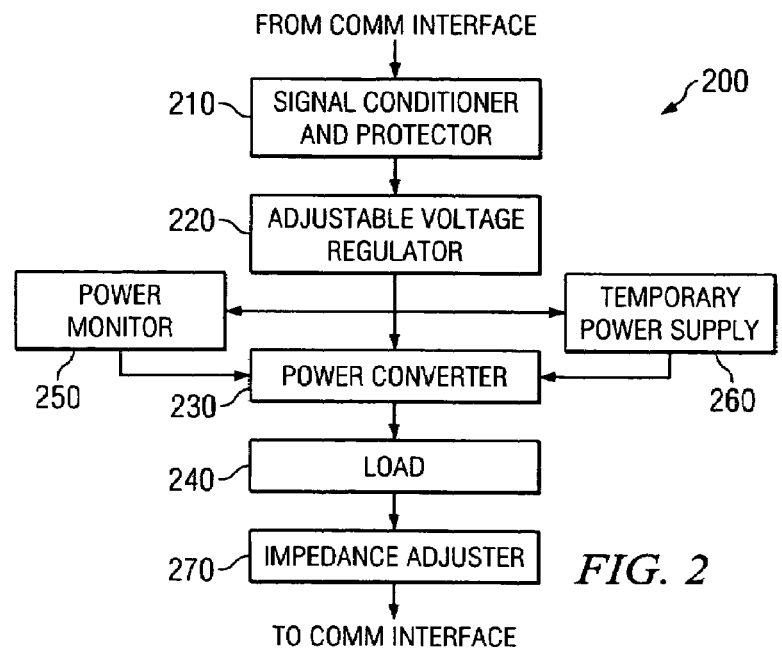
FIG. 2 is a block diagram illustrating one implementation of a power regulator for a loop-powered field instrument.

FIG. 2 illustrates a power regulator 200 for a loop-powered field instrument. Power regulator 200 may be one example of power regulator 134 for system 100.

Power regulator 200 includes a signal conditioner and protector 210, an adjustable voltage regulator 220, a power converter 230, and a load 240. In general, signal conditioner and protector 210 conditions a communication-loop signal and protects against deleterious conditions of the signal. The signal is then conveyed to adjustable voltage regulator 220, which adjusts the voltage provided to power converter 230 based on the current of the signal. Power converter 230 then converts the signal to another format using the voltage provided by the adjustable voltage regulator 220 and provides the reformatted signal to load 240, which consumes power of the signal.

In more detail, signal conditioner and protector 210 is operable to receive the communication-loop signal and to condition it. As an example of the latter, signal conditioner and protector 210 may filter the signal for noise and/or reduce current if it is too high. Signal conditioner and protector 210 also protects power regulator 200, and the rest of the field instrument. For example, the signal conditioner and protector may protect against excessive voltages and/or currents by refusing to allow such signals to pass.

Adjustable voltage regulator 220 is coupled to signal conditioner and protector 210 and operable to adjust the voltage provided to power converter 230 based on the current of the loop signal. For example, the regulator may provide a lower voltage (e.g., 7 V) to power converter 230 when a higher current (e.g., 20 mA) is present and a higher voltage (e.g., 9 V) to power converter 230 when a lower current (e.g., 4 mA) is present. Adjustable voltage regulator 220 may, for example, accomplish this by behaving like an adjustable zener diode. In particular implementations, regulator 220 may have built in redundancy to assure reliability.

Power converter 230 is coupled to adjustable voltage regulator 220 and responsible for converting the power of the communication-loop signal. For instance, the power converter may convert a 4 mA signal at 11 V to a 10 mA signal at 3.3 V. To accomplish this, power converter 230 may, for example, include a buck converter or any other appropriate type of converter. The power converter may provide a consistent voltage output for a variable voltage input, where the output power out equals the input power. Particular implementations may use the TPS62056DGS buck converter from Texas Instruments Incorporated of Dallas, Tex.

Load 240 is coupled to power converter 230 and responsible for consuming at least part of the power of the converted signal. Load 240 may, for example, include a controller, a sensor, and/or a transceiver.

Power regulator 200 also includes a power monitor 250, a temporary power supply 260, and an impedance adjuster 270. Power monitor 250 receives at least part of the communication-loop signal and is responsible for monitoring the power (e.g., voltage and/or current) of the signal and refusing to allow power converter 230 to operate if the power is inappropriate (e.g., too low). Allowing power converter 230 to operate when the power of the signal is inappropriate may result in improper operation of the power converter. Temporary power supply 260 also receives at least part of the communication-loop signal. Temporary power supply 260 is responsible for allowing power converter 230 to continue operating with appropriate power if a transitory power insufficiency occurs in the communication-loop signal. Allowing power converter 230 to operate without sufficient power may result in an improper operation sequence of the power converter (e.g., oscillatory) that may take an inordinate amount of time from which to recover. Impedance adjuster 270 is responsible for adjusting an impedance for a secondary communication protocol. The secondary communication protocol may, for example, be the HART Protocol, which is a frequency-shift key communication protocol superimposed over a 4-20 mA loop. Impedance adjuster 270 may adjust the impedance based on frequency.

Power regulator 200 has a variety of features. For example, by using an adjustable voltage regulator, more power may be extracted from the communication-loop signal because the higher voltage that is normally available at lower current may be used to convert a lower current signal instead of the lower voltage that is normally available at higher current. For instance, instead of using a voltage of 9 V, which is often the voltage for a 20 mA signal, to convert a 4 mA signal, the power regulator may use a voltage of 11 V, which is often the voltage for the 4 mA signal. Thus, an increase in power at 4 mA from 36 mW to 44 mW may be achieved. In these modes of operation, power regulator 200 behaves as a negative resistor (i.e., it draws more current at lower voltage than at higher voltage, as opposed to drawing more current as voltage increases). This uncharacteristic operation, however, does not appear to have any detrimental effects on system performance because the current source is a high positive resistance in series with the small negative resistance, resulting in a net resistance that remains positive. Also, the power source makes increased voltage available with decreased current. Thus, the power regulator is suited to the power source.

The adjustable voltage regulator may also prevent large voltage swings in the communication loop by shunting current that is not used by the load. For example, without the adjustable voltage regulator, the 5:1 change in loop current in a 4-20 mA communication loop could result in a 5:1 change in terminal voltage due to the input swing of the power converter (e.g., from 9 V to 1.8 V, a 7.2 V change). A 5:1 swing of terminal voltage is typically unacceptable in a process control loop. With the adjustable voltage regulator, however, the voltage swing may be from 9 V to 11 V, a 2 V change.

Additionally, power regulator 200 assists in starting the power converter properly and in maintaining the proper operation of the power converter. The power converter also facilitates secondary communication through the communication loop by providing impedance matching.

Although FIG. 2 illustrates one implementation of a power regulator, other implementations may include fewer, additional, and/or a different arrangement of components. For example, a power regulator may not include a signal conditioner and protector, especially if signal conditioning and protection is provided another component of the field instrument. As another example, a power regulator may not include a power monitor and/or a temporary power supply, especially if the power converter is robust. As a further example, a power regulator implementation may include an additional power converter. The power converters may, for instance, convert the communication-loop signal to different formats (e.g., 3.3 V and 1.8 V). As an additional example, a power monitor and/or a temporary power supply may be connected to a signal conditioner and protector. As another example, a power regulator may not include an impedance adjuster.

Figure 3:
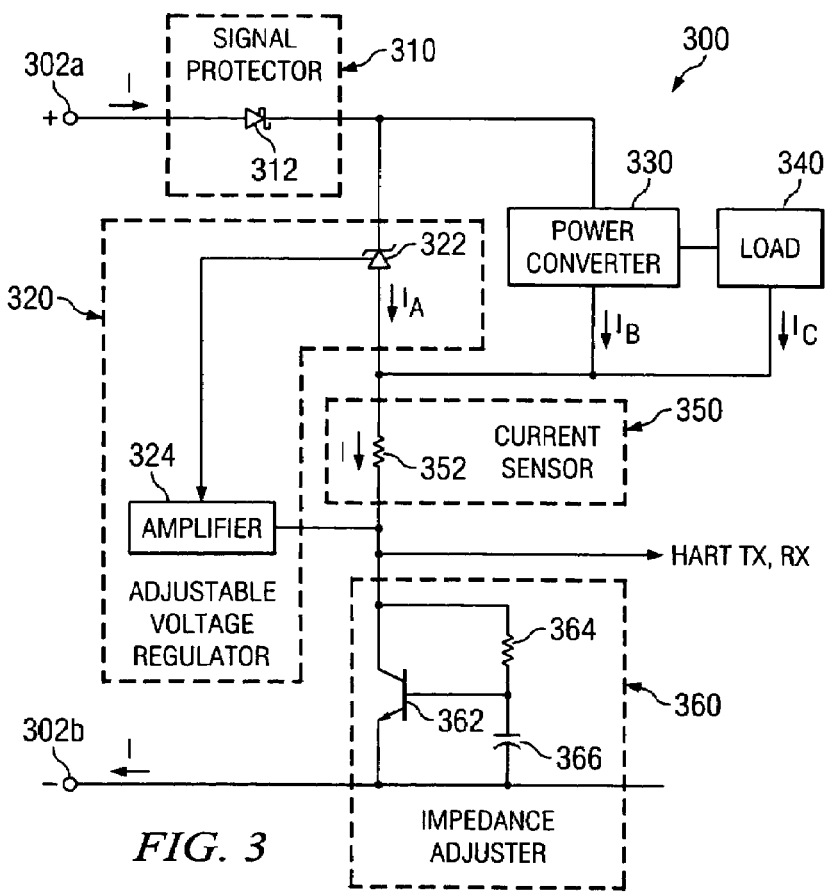
FIG. 3 is a simplified schematic diagram illustrating an implementation of a power regulator for a loop-powered field instrument.

FIG. 3 illustrates one implementation of a power regulator 300 for a loop-powered field instrument. Power regulator 300 includes a signal protector 310, an adjustable voltage regulator 320, a power converter 330, a load 340, a current sensor 350, and an impedance adjuster 360. Power regulator 300 may be one example of power regulator 134 of system 100.

Signal protector 310 is operable to receive a communication-loop signal through an input terminal 302a and provide protection to power regulator 300 from detrimental signal conditions. As illustrated, signal protector 310 includes a Schottky diode 312. Schottky diode 312 prevents reverse voltages, which may be detrimental to power regulator 300.

Adjustable voltage regulator 320 is operable to adjust the voltage applied to power converter 330 based on the current of the communication-loop signal. Adjustable voltage regulator 320 includes an adjustable zener diode 322 and an amplifier 324. Adjustable zener diode 322 is operable to establish a voltage based on a signal from amplifier 324, which receives an indication of the current of the communication-loop signal from current sensor 350. Amplifier 324 may also provide offset.

Power converter 330 is coupled in parallel with adjustable zener diode 322 and, hence, receives the voltage established by the diode. Power converter 330 converts power of the communication-loop signal into a format acceptable for load 340.

Current sensor 350 receives the current supplied to the power regulator and provides an indication of the current to amplifier 324. To accomplish this, current sensor 350 includes a resistor 352. Resistor 352 generates a voltage that is received by amplifier 324.

Impedance adjuster 360 is operable to adjust an impedance of voltage regulator 300 for the HART Protocol. Impedance adjuster 360 includes a transistor 362, a resistor 264, and a capacitor 366. Transistor 362 behaves similar to a diode at low frequency, providing a small voltage drop, but provides a higher impedance at higher frequencies.

In one mode of operation, power regulator 300 receives a 4-20 mA signal I at 9-11 V through input terminal 302a. The signal passes through signal protector 310, which prevents the signal from passing if it has unacceptable characteristics. Part of the signal, Ia, passes through adjustable voltage regulator 320, part of the signal, Ib, passes through power converter 330, and part of the signal, Ic, passes through load 340. Signal I, however, is then recombined and passes through current sensor 350. Current sensor 350 generates a voltage based on the current of signal I. Amplifier 324 senses the voltage at the current sensor and drives adjustable zener diode 322 to a set point, which sets the voltage for power converter 330. When signal I is approximately 4 mA, the voltage for the power converter is approximately 9 V, and when signal I is approximately 20 mA, the voltage for the power converter is approximately 7 V. Because of voltage drops caused by adjustable voltage regulator 320, current sensor 350, and impedance matcher 360, the voltage provided for power converter 330 is between approximately 7 V and 9 V, instead of 9 V and 11 V. Impedance adjuster 360 adjusts an impedance for voltage regulator 300 so that communications according to the HART Protocol may be achieved. The communication-loop signal then flows out through terminal 302b.

In certain implementations, amplifier 324 may also facilitate the shunting of current away from the parallel devices if the voltage is too high. This may, for example, be accomplished by coupling the output of amplifier 324 to the gate of a transistor that has its source coupled to the input of the communication loop and its drain coupled to ground.

Figure 4:
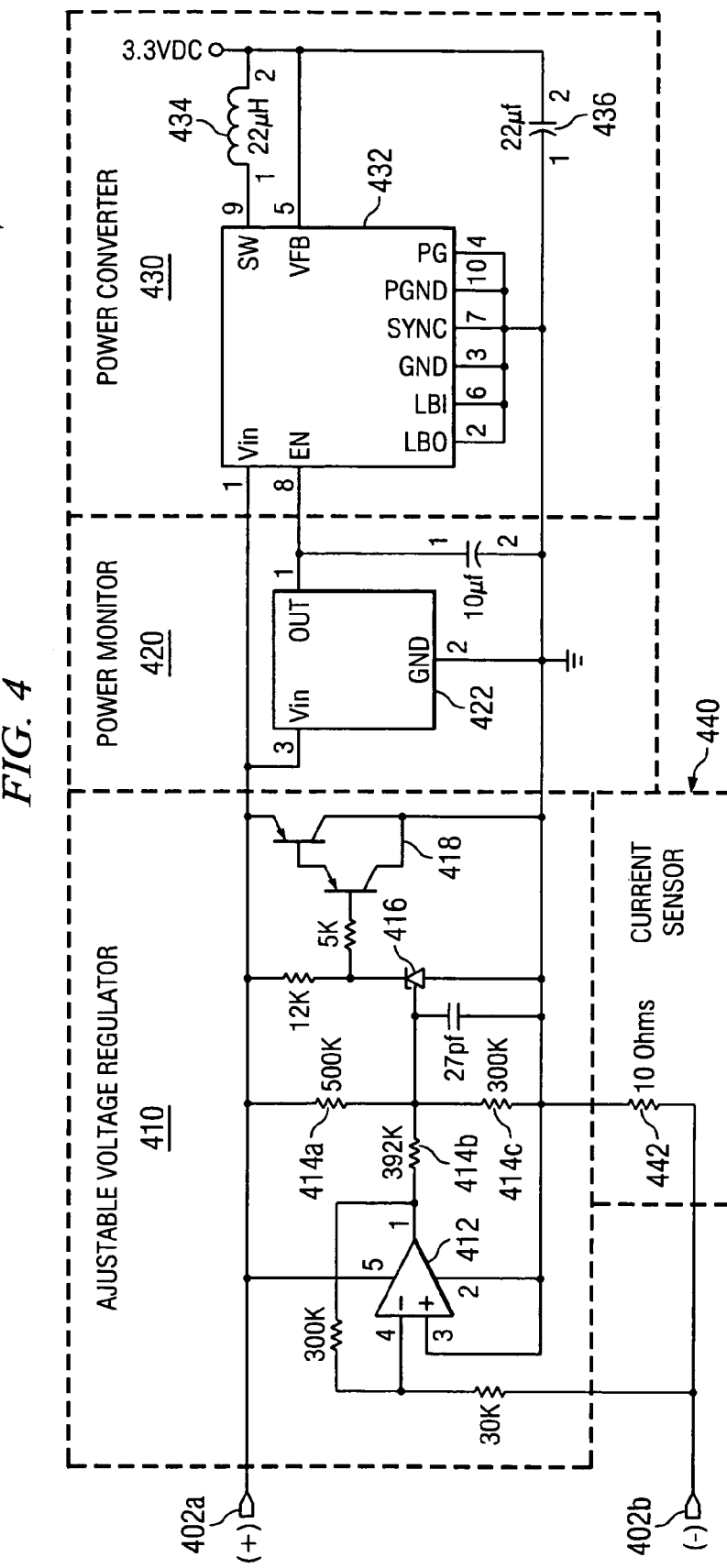
FIG. 4 is a detailed schematic diagram illustrating an implementation of a power regulator for a loop-powered field instrument.

FIG. 4 illustrates another implementation of a power regulator 400 for a loop-powered field instrument. Power regulator 400 includes an adjustable voltage regulator 410, a power monitor 420, a power converter 430, and a current sensor 440. In general, adjustable voltage regulator 410 adjusts the voltage supplied to power converter 430 based on the current in a communication loop, which is sensed by current sensor 440. Power regulator 400 may be one example of power regulator 134.

In more detail, adjustable voltage regulator 410 is coupled to the terminals 402 of a communication loop and includes an operational amplifier 412, a set of biasing resistors 414, a voltage variable zener diode 416, and a set of Darlington transistors 418, the voltage variability of zener diode 416 being controlled by operational amplifier 412. Power monitor 420 is coupled to voltage regulator 410 and includes a voltage detector 422. Power converter 430 is coupled to power monitor 420 and includes a power converter driver 432, an inductor 434, and a capacitor 436. The power converter also receives the loop signal and the regulated voltage from the adjustable voltage regulator. Current sensor 440 is coupled to adjustable voltage regulator 410, power monitor 420, and power converter 430, as well as the load, and, hence, the current from the various components flows into the current sensor. The current sensor includes a resistor 442, which senses the current in the communication loop and generates a voltage with respect to ground that is representative of the loop current.

In one mode of operation, a 4-20 mA loop signal through terminals 402, produces 40 mV to 200 mV signal across resistor 442 of current sensor 440. This indication of the loop current is provided to operational amplifier 412, which amplifies the 40 mV to 200 mV signal to 400 mV to 2,000 mV. The 400 mV to 2,000 mV signal is biased by resistors 414 to cause voltage variable zener diode 416 to swing 9 V to 7 V. Thus, the voltage measured between terminals 402 is approximately 9 V at 4 mA and 7 V at 20 mA (i.e., the current into power converter 430 decreases as the input voltage increases, complimenting the voltage available from the 4 to 20 mA source). Darlington transistors 418 boost the power handling capacity of zener diode 416.

Voltage detector 422 allows power converter 430 to start when there is sufficient voltage available. When operating, power converter driver 432 receives a portion of the loop signal and converts the voltage of the portion to another other voltage, which is appropriate for at least some of the components of the field instrument. Power converter driver 432 outputs the converted signal to inductor 434 for a period of time, which stores the energy of the signal. When power converter driver 432 stops outputting the converted signal to inductor 434, the energy in the inductor is commutated to capacitor 436, from which the field-instrument components may draw it. The output of capacitor 436 is fed back to power converter driver 432, and when the voltage on the capacitor is low, the power converter driver again energizes inductor 434. The power converter may, for example, convert the input voltage (Vin) to 3.3 Volts.

Power regulator 400 has a variety of features. For example, it delivers increased power to the load by taking advantage of the fact that at lower currents, more voltage is available than at higher currents. The apparent negative dynamic impedance of the power regulator acts in a direction to cancel the resistive losses of the 4-20 mA loop current source. Power regulator 400 also provides a controlled negative input impedance by setting the adjustable voltage regulator as a function of input loop current and provides a frequency-dependent impedance required for secondary protocol communication. Furthermore, power regulator 400 provides reliable starting.

Although FIG. 4 illustrates one implementation of a power regulator, other implementations may include fewer, additional, and/or a different arrangement of components. For example, a power regulator may include signal conditioning and protection, which may be applied to a signal upon its arrival at the power regulator. In general, signal conditioning and protection may condition loop signals and prevent detrimental signals from reaching the rest of power regulator 400. For instance, signal conditioning and protection may include preventing excessive voltage from reaching the rest of the power regulator (e.g., by using a Zener diode pair coupled between the input and output terminals), removing noise from an input signal by using a balun transformer (e.g., by using an inductor pair coupled to the input and output terminals), noise filtering (e.g., by using a capacitor coupled between the input and output terminals), preventing reverse voltage from reaching the rest of power regulator 400 (e.g., by using a Schottky diode coupled to the positive input terminal), and/or preventing excessive current (e.g., over 30 mA) from reaching the rest of the power regulator (e.g., by using a transistor that operates under the control of an operational amplifier that monitors an indication of the loop current).

As another example, an adjustable voltage regulator may include one or more unadjustable voltage regulators (e.g., conventional zener diodes), which may provide increased reliability. For instance, an adjustable voltage regulator may be operable when the input voltage is less than 12 V, and an unadjustable voltage regulator may be operable when the input voltage is greater than 12 V or if the adjustable voltage regulator fails. Thus, if the input voltage grows unexpectedly large, voltage regulation may continue to occur, and occur with redundancy, which may be part of providing an intrinsically safe device.

As a further example power monitoring may include monitoring the voltage and current in the loop signal. The power converter may be prevented from operating if insufficient power is available.

Particular implementations may include a temporary power supply. A temporary power supply may, for example, be coupled between the adjustable voltage regulator and the power converter and responsible for temporarily supplying power to the power converter if an interruption occurs in the loop signal. A temporary power supply may, for instance, include a capacitor that charges relatively slowly through a fairly large capacitor and discharges fairly rapidly through a diode.

Certain implementations may include an impedance adjuster for adjusting an impedance of the power regulator for the HART Protocol. The HART signals (e.g., a 1 mA peak-to-peak signal at 2,200 Hz, which would cause the loop signal to swing a total of 2 mA) could be imposed on the communication-loop signal and flow through the entire communication loop to a HART modem. The impedance adjuster may include a transistor that is biased on and, hence, behaves as an on diode (low impedance) at low frequency. When coupled with a capacitor, the transistor may behave more like a constant current (high impedance) device that matches the HART impedance requirements at higher frequency. Thus, the impedance adjuster may provide low dynamic impedance at low frequency and high dynamic impedance at AC. In fact, it may look like a fixed voltage at DC. In particular implementations, the impedance adjuster may have an impedance of approximately 300 Ohms at the frequencies of the HART signals (e.g., above 1,000 Hz) and a constant 0.7 V at low frequency.

Figure 5:
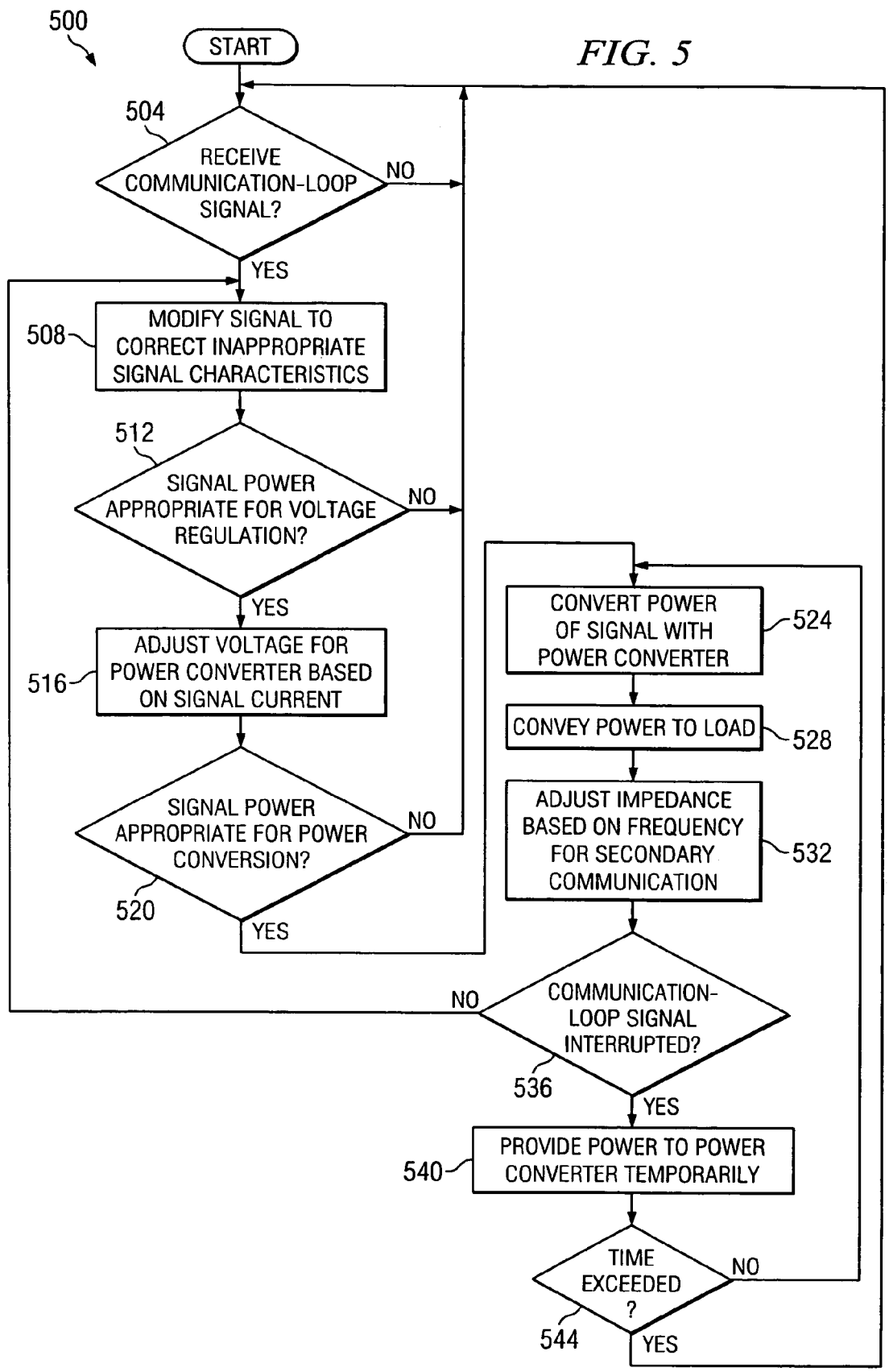
FIG. 5 is a flow chart illustrating one implementation of a process for power regulation of a loop-powered field instrument.

FIG. 5 illustrates a process 500 for power regulation at a loop-powered field instrument. Process 500 may be one example of the operation of power regulator 134 for system 100.

Process 500 begins with waiting to receive a communication-loop signal (operation 504). The communication-loop signal may, for example, be a 4-20 mA signal. Once the communication-loop signal is received, process 500 calls for modifying the signal to correct inappropriate signal characteristics (operation 508). For example, noise in the signal may be canceled and/or filtered and excessive voltage may be blocked. Process 500 also calls for determining whether the signal power (e.g., current and/or voltage) is appropriate for voltage regulation (operation 512). If the signal power is not appropriate for voltage regulation, the process calls for waiting for an appropriate signal power.

Process 500 continues with adjusting the voltage for a power converter based on the signal current (operation 516). For example, the power converter voltage may be low for a high current (e.g., 7 V for a 20 mA signal) and high for a low current (e.g., 9 V for a 4 mA signal). The voltage may, for instance, be adjusted on an approximately linear basis in relation to the current.

Process 500 also calls for determining whether the signal power is appropriate for power conversion (operation 520). If the signal power is not appropriate (e.g., too low for power conversion), process 500 calls for waiting until the signal power is appropriate. If, however, the signal power is appropriate, process 500 calls for converting power of the signal with the power converter (operation 524). For example, a 4 mA signal at 9 V may be converted to a 10 mA signal at 3.3 V. The converted signal may then be conveyed to a load (e.g., a processor) (operation 528).

Process 500 continues with adjusting the impedance for a secondary communication based on frequency (operation 532). For example, the impedance may increase as a function of frequency in the region of the HART modulated frequencies.

Process 500 continues with determining whether the communication-loop signal has been interrupted (operation 536). If the communication-loop signal has not been interrupted, process 500 calls for continuing to modify the signal (operation 508), adjust power converter voltage based on signal current (operation 516), and convert power of the signal (operation 524).

If, however, the communication-loop signal has been interrupted, process 500 continues with temporarily providing power to the power converter (operation 540). Process 500 also calls for determining whether the time for providing power to the power converter has been exceeded (operation 544). If the time has not been exceeded, the process continues to covert power of the signal (operation 524). The process may also determine whether the communication-loop signal has been restored (operation 536). If the communication-loop signal has been restored, the process continues with modifying the signal (operation 508), adjusting power converter voltage based on signal current (operation 516), and converting power of the signal (operation 524). If, however, the time has been exceeded, the process calls for waiting to receive the communication-loop signal (operation 504).

Although FIG. 5 illustrates one process for power regulation, other processes for power regulation may include fewer, additional, and/or a different arrangement of operations. For example, a power-regulation process may not include determining whether the power is appropriate for signal voltage regulation or power conversion. As another example a power-regulation process may not include temporarily providing power to a power converter if the communication-loop signal is interrupted. As a further example, a power-regulation process may include converting power of the communication-loop signal with a second power converter. For instance, a first power converter may convert signal power to a first voltage, and the second power converter may convert signal power to a second voltage.

Figure 6:
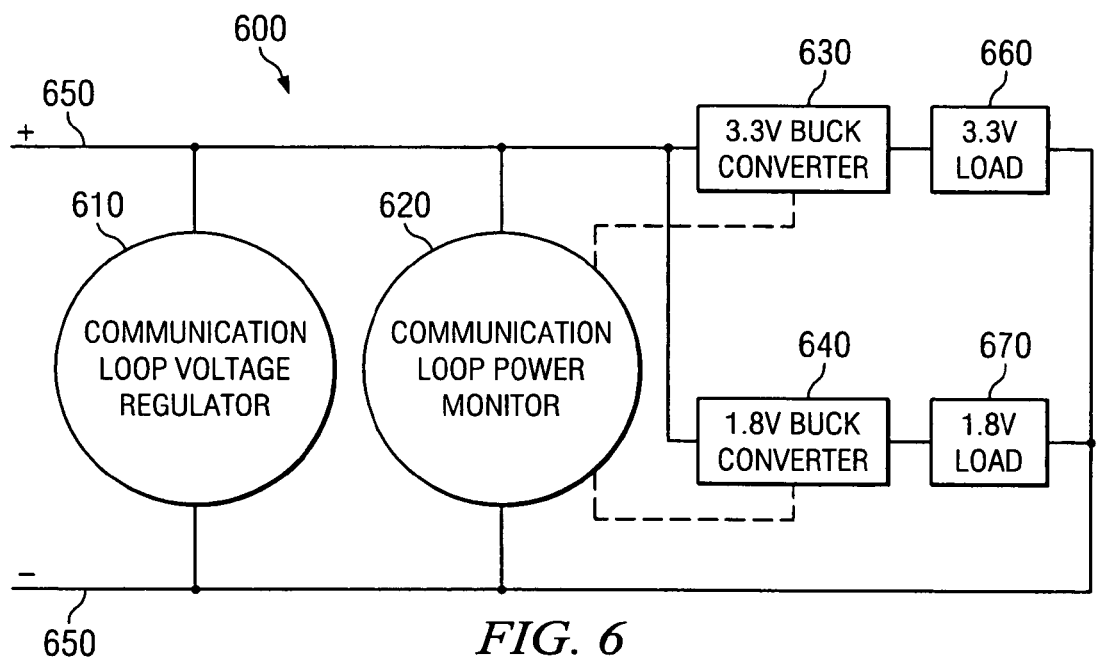
FIG. 6 is a block diagram illustrating one implementation of a power converter for a loop-powered field instrument.

FIG. 6 illustrates a power converter 600 for a loop-powered field instrument. Power converter 600 includes a communication-loop voltage regulator 610, a communication-loop power monitor 620, a first buck converter 630, and a second buck converter 640.

Voltage regulator 610 regulates the voltage from a communication loop 650. For example, in a 4-20 mA loop, the voltage may range between approximately 12 and 24 V. (This voltage may be less when it reaches power converter 600, however, due to drops created by barriers and other safety components.) Voltage regulator 610 may regulate the voltage so that it is at a fairly consistent value (e.g., approximately 10 V). In certain implementations, however, voltage regulator 610 may regulate the voltage so that is varies with input current (e.g., 11 V for 4 mA and 9 V for 20 mA). Regulating the voltage may provide increased performance of the buck converters.

Power monitor 620 monitors the communication loop during startup and prevents the converters from functioning until sufficient power (voltage and/or current) is available. If the converters begin operating before a sufficient amount of power is in the communication loop, oscillations and/or spurious outputs may occur. In this implementation, the power monitor circuit enables the converters when sufficient power is available (represented by the dashed lines). In other implementations, the power monitor circuit may prevent the converters from operating by any other appropriate technique (e.g., short circuiting).

Buck converter 630 and buck converter 640, which are one type of power converter, are coupled in parallel with each other. The communication-loop signal, therefore, is split into two portions, with buck converter 630 converting a first portion of the signal to a 3.3 V signal and buck converter 640 converting a second portion of the signal to a 1.8 V signal. The buck converters may produce consistent voltage outputs while allowing the current outputs to vary based on load. The power converters may operate according to pulse drop, pulse-width modulation, or other appropriate techniques and may be particularly adapted to operate at low powers (e.g., <2 W). Thus, they may be particularly useful for loop-powered field instruments, which often derive their power from low-power signals (e.g., 4-20 mA at 12-24 V). Appropriate converters are the TPS62054DGS and the TPS62056DGS from Texas Instruments Incorporated of Dallas, Tex.

In one mode of operation, voltage regulator 610 waits to receive a communication-loop signal and, upon receiving a communication-loop signal, regulates the signal to approximately 10 V. Increased current due to this regulation may be shunted through the voltage regulator. Power monitor circuit 620 also waits to receive the communication-loop signal. Power monitor 620, however, monitors the power in the signal and enables buck converter 630 and buck converter 640 when the power in the loop signal is above a predetermined threshold (e.g., 48 mW). Once enabled, buck converter 630 converts a portion of the voltage-regulated loop signal to a 3.3 V signal, and buck converter 640 converts a portion of the voltage-regulated loop signal to a 1.8 V signal. For a 4 mA signal at 11.5 V, the output of buck converter 630 may be a 12.7 mA signal at 3.3 V. The converted signal portions may then be supplied to the appropriate components of the field instrument, represented here as a load 660 and a load 670. The current of the loop signal may be split between the buck converters based on the load for each.

The implementation of a power converter illustrated by FIG. 6 has a variety of features. For example, by being able to convert a 4 mA signal at 11.5 V to a 12.7 mA signal at 3.3 V, a conversion efficiency of over 90% may be achieved, which is significantly better than that achieved by current voltage converters, such as a switched-capacitor voltage converter or a linear voltage converter (typically in the 60-70% range). Thus, more current may be provided to the field instrument's components. Also, this implementation allows two different sets of electronic components of a field instrument to be powered by power signals having a consistent voltage. This implementation additionally prevents voltage conversion under at least some circumstances in which it could be ineffective.

Although power converter 600 has been illustrated as having two buck converters, in other implementations, a power converter may have any appropriate number of buck converters (e.g., 1 or more). Also, if the voltage and/or power of the communication loop is stable and appropriate, voltage regulator 610 and/or power monitor 620 may be eliminated. Other performance enhancing components (e.g., power interruption protection) could also be included.

FIG. 7 illustrates a process 700 for power conversion for a loop-powered field instrument. Process 700 may, for example, exemplify a mode of operation for power converter 600.

Process 700 begins with waiting to receive a communication-loop signal (operation 704). The communication-loop signal may be generated by an external device and supplied at appropriate times and/or intervals or continuously. In particular implementations, the communication-loop signal is a 4-20 mA signal provided at between approximately 12-24 V. Thus, the power characteristics of the loop signal may vary.

Upon receiving the communication-loop signal, process 700 calls for determining whether the signal is of appropriate power (operation 708). If the signal is not of appropriate power, the process calls for waiting for the signal to achieve appropriate power.

Once the communication-loop signal is of appropriate power, process 700 continues with determining whether the voltage of the communication-loop signal is appropriate (operation 712). For example, a voltage that varies over a wide range (e.g., 12-24 V) may be difficult for components of a loop-powered field instrument to handle. The voltage, therefore, may be stepped down to an acceptable level (e.g., approximately 10 V). If the voltage of the communication loop signal is not appropriate, the communication loop signal voltage is modified to an appropriate level (operation 716).

Process 700 continues with splitting the communication-loop signal into two portions (operation 720). A first portion of the signal is generated into a first power signal with a first voltage (e.g., from 10 V to 3.3 V) by a first buck converter (operation 724), and a second portion of the signal is generated into a second power signal with a second voltage (e.g., from 10 V to 1.8 V) by a second buck converter (operation 728). The first power signal is sent to a first set of components of the field instrument (operation 732), and the second power signal is sent to a second set of components of the field instrument (operation 736).

Process 700 may continue with receiving the communication-loop signal, evaluating the appropriateness of the signal, splitting the signal into two portions, and generating power signals from the portions for any appropriate number of periods or amount of time.

Although FIG. 7 illustrates a process for power conversion for a loop-powered field instrument, other power conversion processes for loop-powered field instruments may include fewer, additional, and/or a different arrangement of operations. For example, a power conversion process may only down convert the communication-loop signal to one voltage. As another example, a power conversion process may split and down convert the communication-loop signal into more than two signals. As a further example, a power conversion process may not determine whether the power of the communication loop signal is appropriate. As an additional example, a power conversion process may store part of the power of the communication-loop signal to alleviate the effects of transient power decreases. As another example, one or more operations in process 700 may occur simultaneously (e.g., operation 724 and operation 728).

A number of implementations for achieving power regulation have been discussed, and several others have been mentioned or suggested. Furthermore, a variety of additions, deletions, substitutions, and/or modifications to these implementations will be readily suggested to those skilled in the art while still accomplishing power regulation. For at least these reasons, the invention is to be measured by the following claims, which may include one or more of the implementations.

The invention claimed is:

1. A power-regulation method for a field instrument, the method comprising:
   receiving a communication signal;
   adjusting the voltage supplied to a power converter based on the current of the communication signal;
   converting power of the communication signal with the power converter using the adjusted supplied voltage;
   determining whether the voltage of the communication signal is appropriate; and
   if the voltage of the communication signal is not appropriate, refusing to convert power of the communication signal with the power converter.

2. The method of claim 1, further comprising monitoring the communication signal when it arrives at the field instrument for an inappropriate characteristic.

3. The method of claim 2, wherein an inappropriate characteristic includes at least one of an inappropriate voltage level, current level, and noise level.

4. The method of claim 2, further comprising modifying the communication signal to correct the inappropriate signal characteristic.

5. The method of claim 1, wherein adjusting the voltage supplied to a power converter based on the current of the communication signal comprises:
   increasing the voltage if the signal current is low; and
   decreasing the voltage if the signal current is high.

6. The method of claim 5, wherein the voltage is adjusted on an approximately linear basis in relation to the signal current.

7. The method of claim 5, wherein:
   the communication signal is a communication-loop signal;
   the supplied voltage is approximately 9 V when the current is approximately 4 mA; and
   the supplied voltage is approximately 7 V when the current is approximately 20 mA.

8. The method of claim 1, further comprising:
   determining whether an interruption in the communication signal has occurred; and
   if an interruption in the communication signal has occurred, temporarily supplying power to the power converter.

9. The method of claim 1, further comprising converting power of the communication signal with a second power converter.

10. The method of claim 1, wherein the communication signal comprises a current-based control signal for the field instrument.

11. A field instrument comprising:
a communication interface operable to receive a communication signal;
a power converter coupled to the communication interface, the power converter operable to convert power of the communication signal using a supplied voltage;
an adjustable voltage regulator coupled to the power converter, the adjustable voltage regulator operable to adjust the voltage supplied to the power converter based on the current of the communication signal; and
a power monitor coupled to the communication interface and the power converter, the power monitor operable to:
determine whether the voltage of the communication signal is appropriate; and
if the voltage of the communication signal is appropriate, allow the power converter to operate.

12. The field instrument of claim 11, wherein the adjustable voltage regulator is operable to increase the supplied voltage if the signal current is low and decrease the supplied voltage if the signal current is high to adjust the voltage supplied to the power converter based on the current of the communication signal.

13. The field instrument of claim 11, further comprising a power supply coupled to the communication interface and the power converter, the power supply operable to temporarily supply power to the power converter if the communication signal is interrupted.

14. The field instrument of claim 11, further comprising a second power converter coupled to the communication interface, the second power converter operable to convert power of the communication signal.

15. The field instrument of claim 11, wherein the communication signal comprises a current-based control signal for the field instrument.

16. A field instrument comprising:
a communication interface operable to receive a communication-loop signal;
a first power converter coupled to the communication interface, the first power converter operable to convert power of the communication-loop signal;
a second power converter coupled to the communication interface, the second power converter operable to convert power of the communication-loop signal;
an adjustable voltage regulator coupled to the power converters, the adjustable voltage regulator operable to adjust the voltage supplied to the power converters based on the current of the communication-loop signal, the adjustment comprising:
increasing the voltage if the signal current is low, and decreasing the voltage if the signal current is high;
a power monitor coupled to the communication interface and the power converters, the power monitor operable to:
determine whether the voltage of the communication-loop signal is appropriate, and
if the voltage of the communication-loop signal is appropriate, allow the power converters to operate; and
a power supply coupled to the communication interface and at least one of the power converters, the power supply operable to temporarily supply power to at least one of the power converters if the communication-loop signal is interrupted.

17. A power-regulation method for a field instrument, the method comprising:
receiving a communication signal;
adjusting the voltage supplied to a power converter based on the current of the communication signal;
converting power of the communication signal with the power converter using the adjusted supplied voltage;
determining whether an interruption in the communication signal has occurred; and
if an interruption in the communication signal has occurred, temporarily supplying power to the power converter.

18. The method of claim 17, further comprising monitoring the communication signal when it arrives at the field instrument for an inappropriate characteristic.

19. The method of claim 18, wherein an inappropriate characteristic includes at least one of an inappropriate voltage level, current level, and noise level.

20. The method of claim 18, further comprising modifying the communication signal to correct the inappropriate signal characteristic.

21. The method of claim 17, wherein adjusting the voltage supplied to a power converter based on the current of the communication signal comprises:
increasing the voltage if the signal current is low; and
decreasing the voltage if the signal current is high.

22. The method of claim 21, wherein the voltage is adjusted on an approximately linear basis in relation to the signal current.

23. The method of claim 21, wherein:
the communication signal is a communication-loop signal;
the supplied voltage is approximately 9 V when the current is approximately 4 mA; and
the supplied voltage is approximately 7 V when the current is approximately 20 mA.

24. The method of claim 17, farther comprising:
determining whether the voltage of the communication signal is appropriate; and
if the voltage of the communication signal is not appropriate, refusing to convert power of the communication signal with the power converter.

25. The method of claim 17, further comprising converting power of the communication signal with a second power converter.

26. The method of claim 17, wherein the communication signal comprises a current-based control signal for the field instrument.

27. A field instrument comprising:
a communication interface operable to receive a communication signal;
a power converter coupled to the communication interface, the power converter operable to convert power of the communication signal using a supplied voltage;
an adjustable voltage regulator coupled to the power converter, the adjustable voltage regulator operable to adjust the voltage supplied to the power converter based on the current of the communication signal; and
a power supply coupled to the communication interface and the power converter, the power supply operable to temporarily supply power to the power converter if the communication signal is interrupted.

28. The field instrument of claim 27, wherein the adjustable voltage regulator is operable to increase the supplied voltage if the signal current is low and decrease the supplied voltage if the signal current is high to adjust the voltage supplied to the power converter based on the current of the communication signal.

29. The field instrument of claim 27, further comprising a power monitor coupled to the communication interface and the power converter, the power monitor operable to:
   determine whether the voltage of the communication signal is appropriate; and
   if the voltage of the communication signal is appropriate, allow the power converter to operate.

30. The field instrument of claim 27, further comprising a second power converter coupled to the communication interface, the second power converter operable to convert power of the communication signal.

31. The field instrument of claim 27, wherein the communication signal comprises a current-based control signal for the field instrument.

* * * * *

UNITED STATES PATENT AND TRADEMARK OFFICE
CERTIFICATE OF CORRECTION

PATENT NO. : 7,480,487 B2  Page 1 of 1
APPLICATION NO. : 11/134031
DATED : January 20, 2009
INVENTOR(S) : Harold R. Smart It is certified that error appears in the above-identified patent and that said Letters Patent is hereby corrected as shown below:

Sheet 3 of 6 Drawings, FIG. 4, Line 1, (Reference Numeral 410),
Delete "AJUSTABLE" insert --ADJUSTABLE--, therefore.

Sheet 6 of 6 Drawings, FIG. 7, Line 1, (Above Reference Numeral 720),
Above "720" insert --716--.

(56) References Cited, U.S. Patent Documents, Title Page, right column, please add this publication:
7,233,745 B2  10-2000  Klofer et al.  340/870.39

Claim 24, page 16, delete "farther" and insert --further--.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,480,487 B2  Page 1 of 1
APPLICATION NO. : 11/134031
DATED : January 20, 2009
INVENTOR(S) : Harold R. Smart It is certified that error appears in the above-identified patent and that said Letters Patent is hereby corrected as shown below:

Sheet 3 of 6 Drawings, FIG. 4, Line 1, (Reference Numeral 410),
Delete "AJUSTABLE" insert --ADJUSTABLE--, therefore.

Sheet 6 of 6 Drawings, FIG. 7, Line 1, (Above Reference Numeral 720),
Above "720" insert --716--.

(56) References Cited, U.S. Patent Documents, Title Page, right column, please add this publication:
7,233,745 B2  10-2000  Klofer et al.  340/870.39

Column 16, Claim 24, line 37, delete "farther" and insert --further--.

This certificate supersedes the Certificate of Correction issued March 24, 2009.

Signed and Sealed this

Fourteenth Day of April, 2009

JOHN DOLL
*Acting Director of the United States Patent and Trademark Office*